Figure 1:
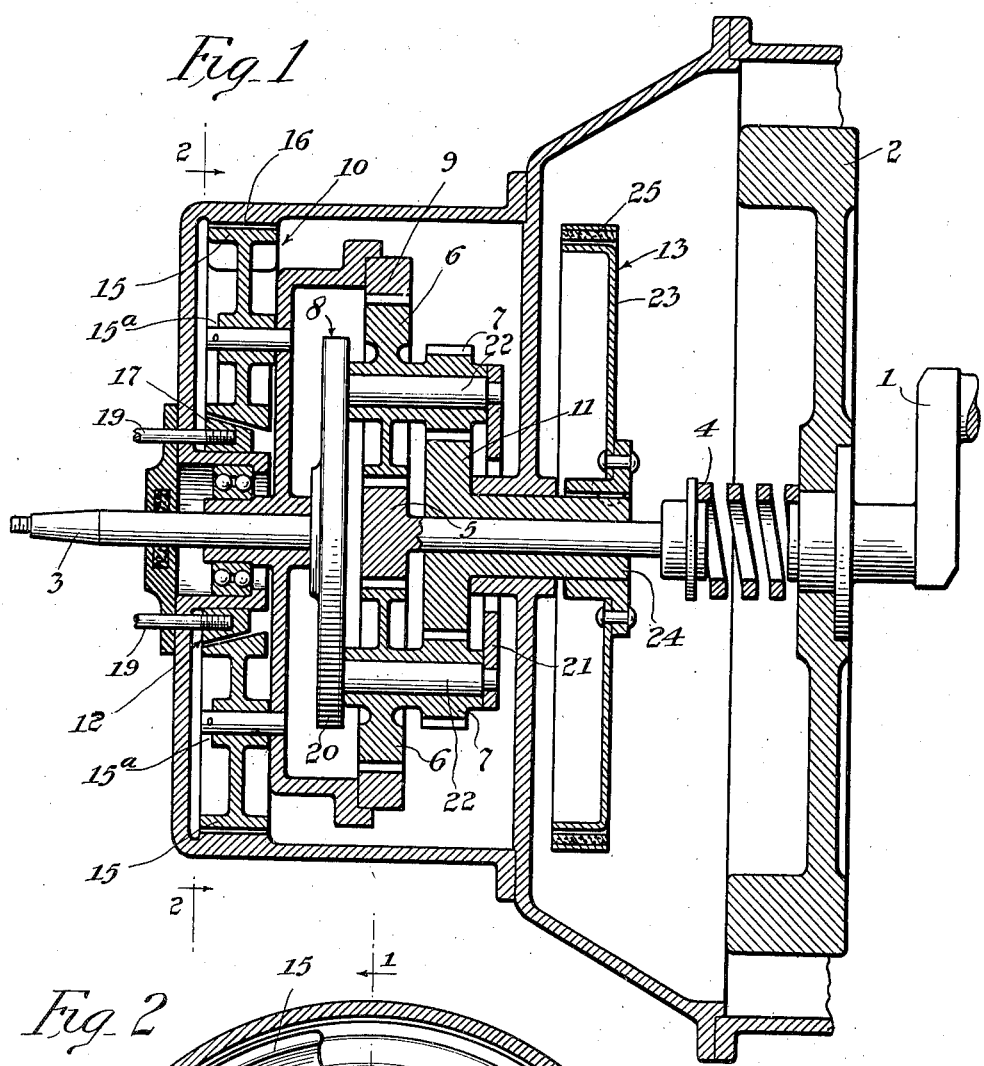

Feb. 27, 1934.   A. Y. DODGE   1,948,847
VARIABLE SPEED TRANSMISSION
Original Filed Jan. 24, 1931

INVENTOR.
A. Y. Dodge
BY Jones, Addington,
Ames & Seibold
ATTORNEY.

Patented Feb. 27, 1934

1,948,847

UNITED STATES PATENT OFFICE 1,948,847

VARIABLE SPEED TRANSMISSION

Adiel Y. Dodge, South Bend, Ind.

Application January 24, 1931, Serial No. 510,920
Renewed January 16, 1933

10 Claims. (Cl. 74—34)

My invention relates to variable speed transmission.

One of the objects of my invention is to provide an improved variable speed transmission between the motor and propulsion of an automobile which will enable smooth pick-up to be obtained with increase of torque at speed ratios of less than one to one and which will have provisions whereby reverse may be readily obtained.

Further objects will appear from the description and claims.

Figure 2:
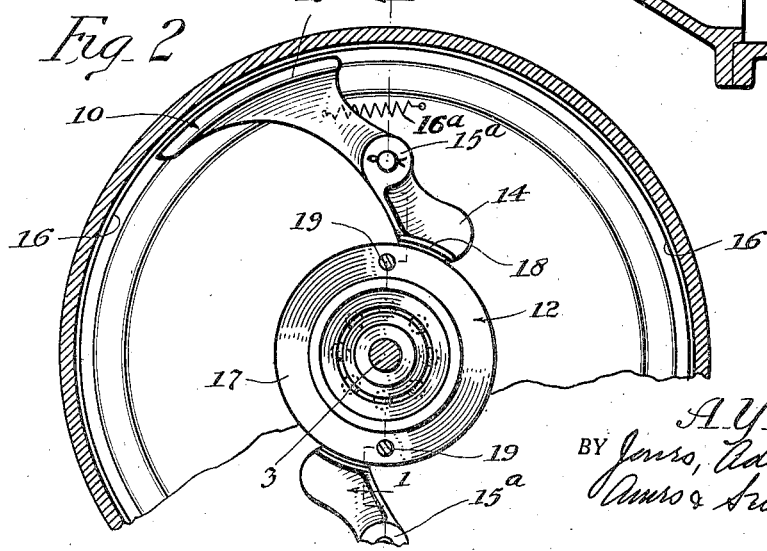

In the drawing, in which an embodiment of my invention is shown:

Figure 1 is an axial section showing the flywheel of the internal combustion motor, the propeller shaft, and the variable speed reversible transmission therebetween; and Fig. 2 is a section on the line 2—2 of Figure 1.

Referring to the drawing in detail, the construction shown comprises the crankshaft 1 and flywheel 2 of an internal combustion engine, a propeller shaft 3 leading to the propulsion, and a variable speed reversible transmission between the motor and the propeller shaft.

This variable speed transmission comprises a coil torsion spring 4 secured to rotate with the crankshaft and flywheel, a sun gear 5 secured to rotate with the driven end of the coil torsion spring, a pair of weighted planetating gears 6 meshing with the sun gear, a pair of planetating gears 7 coaxial and rotatable with the first-mentioned planetating gears 6, a gear carrier 8 on which both sets of planetating gears are mounted, a ring gear 9 meshing with the weighted planetating gears, a one-way reactance device 10 rotatable with the ring gear and mounted thereon, normally preventing reverse rotation of the ring gear while permitting forward rotation thereof, whereby the gear carrier will be positively driven when the sun gear is rotated and whereby reverse impulses of the weighted planetating gears will be rectified to cause forward rotation of the ring gear, a second sun gear 11 meshing with said second set of planetating gears 7, means 12 for rendering said one-way reactance device incapable of preventing reverse rotation, and means 13 for holding said second sun gear against rotation to effect reverse rotation of the gear carrier when the reactance clutch is incapacitated.

The reactance device is provided with centrifugal force means 14 rotatable with the ring gear for holding the clutch out of engaging position when the speed of the ring gear reaches a certain stage, thus preventing any frictional drag of the pivoted clutch shoes.

The reactance device 10 comprises a pair of friction shoes 15 pivotally mounted on pins 15a secured to the web of the ring gear 9, the counterweight 14 being so designed that when the speed of the ring gear 9 reaches a predetermined limit, centrifugal force acting on the counterweight 14 will cause it to move outwardly to hold the friction shoe 15 away from the cooperating annular friction surface 16.

In order that the shoes 15 may be held in engagement with the friction surface 16 when ring gear 9 is standing still or traveling at low speed, light springs 16a may be provided connecting the shoes 15 with the ring gear as shown in Figs. 7 and 11 of my copending application Serial No. 493,950.

The means 12 for incapacitating the reactance device comprises an axially shiftable ring 17 having a conical surface engaging the inwardly-extending arms 18 of the friction shoes 15 so that when the ring 17 is shifted to the right, as viewed in Fig. 1, the friction shoes 15 will be held out of cooperative relation with respect to the friction surface 16. The ring 17 may be shifted by any suitable means acting through the slidable rods 19.

The gear carrier construction 8 comprises a disc 20 secured to the propeller shaft 3, a stiffening ring 21, and a pair of pivot pins 22 extending between and secured to the plate 20 and stiffening ring 21 and serving as shafts on which planetating gears 6 and 7 are mounted.

The means 13 for holding the sun gear 11 against rotation comprise a drum 23, secured to the elongated hub 24 of the sun gear, and a gripping band 25 which may be dragged about the drum 23 to hold it against rotation when desired.

With this construction, the propulsion is always driven direct from the propeller shaft 3, which is directly secured and always moves as a unit with the gear carrier 8. In operation, at low engine speeds, the ring gear 9 remains stationary, being held against reverse rotation, and the gear carrier 8 is driven at a lower speed than the sun gear in the well-known manner of planetary transmission, the gripping band being in position to permit the secondary sun gear to rotate freely without exerting any substantial effect on the transmission. As the engine speed increases, the impulses, due to the action of the weighted planetating gears, will cause the ring gear to start to rotate, the reverse impulses of the planetating gears being rectified by the action of the one-way reactance device, thus giving a torque increase at all speeds less than one to one. As the speed of the gear carrier increases, the impulsive action of the planetating gears on the ring gear also increases, due to centrifugal force, and eventually the ring gear will be caused to rotate at the same speed as the gear carrier, thus giving a one to one transmission between the motor and propeller shaft with no relative motion of parts. At a certain stage in the speed of the ring gear, centrifugal force acting on the weights of the pivoted shoes will act to throw these shoes out of engagement with the annular friction surface so that these shoes will thereafter exert no friction drag.

For reverse, the ring 17 is shifted to the right to free the friction shoes 15 from engagement with the friction surface 16 and the band 25 is tightened to hold the drum 23 against rotation. Under these conditions, rotation of the driving sun gear 5 will cause the planetating gears 7 to rotate in a direction which will drive the gear carrier 8 in a direction reverse that of the driving sun gear 5, due to the fact that the sun gear 11 is held against rotation.

With this construction, it will be seen that all forward speeds, as well as reverse speed, may be obtained direct from the gear carrier 8.

While but a single embodiment of this invention is disclosed, it is to be understood that various modifications thereof may be apparent to those skilled in the art without departing from the spirit and scope of this invention, and, therefore, the same is to be limited only by the scope of the prior art and the appended claims.

I claim:

1. A variable speed reversible transmission comprising a driving sun gear, an eccentrically weighted planet gear meshing therewith, a gear carrier for said planet gear, a ring gear meshing with said planet gear, a one-way reactance device preventing rotation of the ring gear in one direction and permitting it in the other, whereby the gear carrier will be positively driven when the sun gear is rotated and whereby reverse impulses of the weighted planet gear will be rectified to cause forward rotation of the ring gear, a second planet gear coaxial and rotatable with said first planet gear and of less pitch diameter than said first planet gear, a second sun gear meshing with said second planet gear, means for rendering said reactance device incapable of preventing reverse rotation, and means for holding said second sun gear against rotation to effect reverse rotation of the gear carrier when the reactance device is incapacitated.

2. A variable speed reversible transmission comprising a driving sun gear, an eccentrically weighted planet gear meshing therewith, a gear carrier for said planet gear, a ring gear meshing with said planet gear, a one-way reactance device preventing rotation of the ring gear in one direction and permitting it in the other, whereby the gear carrier will be positively driven when the sun gear is rotated and whereby reverse impulses of the weighted planet gear will be rectified to cause forward rotation of the ring gear, a second planet gear coaxial and rotatable with said first planet gear and of less pitch diameter than said first planet gear, a second sun gear meshing with said second planet gear, means for rendering said reactance device incapable of preventing reverse rotation, means for holding said second sun gear against rotation to effect reverse rotation of the gear carrier when the reactance device is incapacitated, and centrifugal force means rotatable with the ring gear for holding said device out of engaging position when the speed of the ring gear reaches a certain stage.

3. A variable speed reversible transmission comprising a driving sun gear, an eccentrically weighted planet gear meshing therewith, a gear carrier for said planet gear, a ring gear meshing with said planet gear, a one-way reactance device preventing rotation of the ring gear in one direction and permitting it in the other, whereby the gear carrier will be positively driven when the sun gear is rotated and whereby reverse impulses of the weighted planet gear will be rectified to cause forward rotation of the ring gear, a second planet gear coaxial and rotatable with said first planet gear and of less pitch diameter than said first planet gear, a second sun gear meshing with said second planet gear, means for rendering said reactance device incapable of preventing reverse rotation, means for holding said second sun gear against rotation to effect reverse rotation of the gear carrier when the reactance device is incapacitated, a motor, and a rotarially yielding connection between said motor and the first sun gear.

4. A variable speed transmission comprising planetary alternating impulse, centrifugal force transmission, one-way infinite ratchet reactance means for rectifying the reversely acting impulses, said planetary transmission comprising eccentrically loaded planet gearing, a driving gear meshing with said planet gearing, a driven gear meshing with said planet gearing and a control gear also meshing with said planet gearing.

5. A variable speed transmission comprising planetary alternating impulse, centrifugal force transmission, one-way infinite ratchet reactance means for rectifying the reversely acting impulses, said planetary transmission comprising eccentrically loaded planet gearing, a driving gear meshing with said planet gearing, a driven gear meshing with said planet gearing, a control gear also meshing with said planet gearing, and means for selectively holding said control gear against rotation to change the control exerted on the planet gearing.

6. A variable speed transmission comprising a motor, a shaft, planetary alternating impulse, centrifugal force transmission, one-way reactance means for rectifying the reversely acting impulses, yielding transmission between the shaft and planetary transmission to prevent the reversely acting impulses from unduly affecting the rotation of the shaft, said planetary transmission comprising eccentrically loaded planet gearing, a driving gear driven from said shaft meshing with said planet gearing, a driven gear meshing with said planet gearing, and a control gear also meshing with said planet gearing.

7. A variable speed transmission comprising a motor, a shaft, planetary alternating impulse, centrifugal force transmission, one-way reactance means for rectifying the reversely acting impulses, yielding transmission between the shaft and planetary transmission to prevent the reversely acting impulses from unduly affecting the rotation of the shaft, said planetary transmission comprising eccentrically loaded planet gearing, a driving gear driven from said shaft meshing with said planet gearing, a driven gear meshing with said planet gearing, a control gear also meshing with said planet gearing, and means for selectively holding said control gear against rotation to change the control exerted on the planet gearing.

8. A variable speed transmission comprising a motor, a shaft, planetary alternating impulse, centrifugal force transmission, one-way reactance means for rectifying the reversely acting impulses, yielding transmission between the shaft and planetary transmission to prevent the reversely acting impulses from unduly affecting the rotation of the shaft, said planetary transmission comprising eccentrically loaded planet gearing, a driving gear driven from said shaft meshing with said planet gearing, a driven gear meshing with said planet gearing, a control gear also meshing with said planet gearing, means for selectively holding said control gear against rotation to change the control exerted on the planet gearing, said one-way reactance means being mounted on a rotatable part of the planetary gearing and being provided with centrifugal force means for rendering it ineffective when the rotatable part reaches a predetermined speed.

9. A variable speed transmission comprising a motor, a shaft, planetary alternating impulse, centrifugal force transmission, one-way reactance means for rectifying the reversely acting impulses, yielding transmission between the shaft and planetary transmission to prevent the reversely acting impulses from unduly affecting the rotation of the shaft, said planetary transmission comprising eccentrically loaded planet gearing, a driving gear driven from said shaft meshing with said planet gearing, a driven gear meshing with said planet gearing, a control gear also meshing with said planet gearing, means for selectively holding said control gear against rotation to change the control exerted on the planet gearing, said one-way reactance means being mounted on a rotatable part of the planetary gearing and being provided with centrifugal force means for rendering it ineffective when the rotatable part reaches a predetermined speed, and means for selectively rendering said one-way reactance means ineffective.

10. A variable speed transmission comprising planetary alternating impulse, centrifugal force transmission, one-way infinite ratchet reactance means for rectifying the reversely acting impulses, said planetary transmission comprising eccentrically loaded planet gearing, a driving gear meshing with said planet gearing, a driven gear meshing with said planet gearing, a control gear also meshing with said planet gearing, said one-way reactance means comprising means for rectifying the reversely acting impulses in all positions of the planetary transmission.

ADIEL Y. DODGE.